(12) United States Patent
Reddy

(10) Patent No.: US 10,160,902 B2
(45) Date of Patent: Dec. 25, 2018

(54) MALEIC ANHYDRIDE POLYMERS AND METHODS OF TREATING SUBTERRANEAN FORMATIONS

(71) Applicant: Saudi Arabian Oil Company, Dhahran (SA)

(72) Inventor: B. Raghava Reddy, Pearland, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/263,895

(22) Filed: Sep. 13, 2016

(65) Prior Publication Data

US 2017/0073569 A1 Mar. 16, 2017

Related U.S. Application Data

(60) Provisional application No. 62/218,356, filed on Sep. 14, 2015.

(51) Int. Cl.
| | | |
|---|---|---|
| *C09J 135/02* | (2006.01) | |
| *C09K 8/508* | (2006.01) | |
| *C09K 8/512* | (2006.01) | |
| *C09J 123/22* | (2006.01) | |
| *E21B 33/14* | (2006.01) | |
| *C09K 8/035* | (2006.01) | |
| *C09K 8/50* | (2006.01) | |
| *C09K 8/42* | (2006.01) | |

(52) U.S. Cl.
CPC ........... *C09K 8/5083* (2013.01); *C09J 123/22* (2013.01); *C09J 135/02* (2013.01); *C09K 8/035* (2013.01); *C09K 8/50* (2013.01); *C09K 8/512* (2013.01); *E21B 33/14* (2013.01); *C09K 8/428* (2013.01)

(58) Field of Classification Search
CPC .. C08F 222/06; C08F 8/12; C08F 8/30; C08F 8/32
See application file for complete search history.

(56) References Cited

U.S. PATENT DOCUMENTS

| | | | |
|---|---|---|---|
| 4,049,750 A | 9/1977 | Brenner | |
| 4,172,055 A | 10/1979 | DeMartino | |
| 4,255,537 A * | 3/1981 | Fields ................. | A61K 31/785 525/329.6 |
| 4,420,588 A | 12/1983 | Yoshioka | |
| 4,579,670 A | 4/1986 | Payne | |

(Continued)

FOREIGN PATENT DOCUMENTS

| | | |
|---|---|---|
| DE | 102013219325 | 3/2015 |
| EP | 0050375 A1 | 4/1982 |

(Continued)

OTHER PUBLICATIONS

Gunbas, Progress in Organic Coatings, vol. 76, issue 12, Dec. 2013, p. 1720-1725 (Year: 2013).*

(Continued)

*Primary Examiner* — Robert C Boyle
(74) *Attorney, Agent, or Firm* — Fish & Richardson P.C.

(57) ABSTRACT

This document relates to compositions including a maleic anhydride copolymer or a salt thereof and an amine cross-linker. The maleic anhydride copolymer includes repeat units I and II:

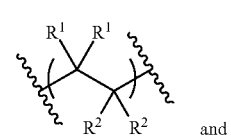

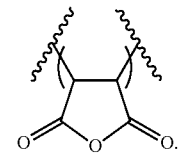

Each $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. The maleic anhydride copolymer further includes at least one hydrolyzed repeat unit selected from repeat units III and IV:

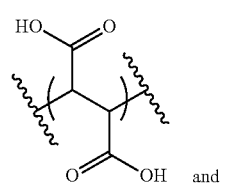

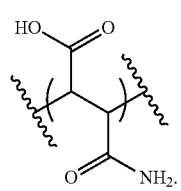

17 Claims, No Drawings

(56) References Cited

U.S. PATENT DOCUMENTS

| | | |
|---|---|---|
| 4,773,481 A | 9/1988 | Allison |
| 4,882,399 A | 11/1989 | Tesoro et al. |
| 6,176,315 B1 | 1/2001 | Reddy et al. |
| 6,192,986 B1 | 2/2001 | Urlwin-Smith |
| 6,225,376 B1 | 5/2001 | Klein et al. |
| 6,245,835 B1 | 6/2001 | Klein et al. |
| 6,384,134 B1 | 5/2002 | Hall et al. |
| 6,431,280 B2 | 8/2002 | Bayliss et al. |
| 6,433,097 B1 | 8/2002 | Nixon et al. |
| 6,509,039 B1 | 1/2003 | Nies |
| 6,710,139 B2 | 3/2004 | Hoyles et al. |
| 7,267,174 B2 | 9/2007 | Gonsveld et al. |
| 7,527,858 B2 * | 5/2009 | Lundquist .................. C08J 5/04 428/337 |
| 7,814,980 B2 | 10/2010 | Bryant et al. |
| 9,150,781 B2 | 10/2015 | Reddy et al. |
| 9,283,299 B2 | 3/2016 | Mikos et al. |
| 9,321,956 B2 | 4/2016 | Nguyen et al. |
| 2003/0181543 A1 | 9/2003 | Reddy |
| 2005/0079222 A1 | 4/2005 | Arbos |
| 2010/0016179 A1 | 1/2010 | Duncum et al. |
| 2010/0036017 A1 | 2/2010 | Eoff et al. |
| 2010/0048429 A1 | 2/2010 | Dobson et al. |
| 2013/0000905 A1 | 1/2013 | Reddy et al. |
| 2013/0220612 A1 | 8/2013 | Karcher et al. |
| 2013/0233546 A1 | 9/2013 | Liang et al. |
| 2013/0269819 A1 | 10/2013 | Ruby |
| 2013/0306314 A1 | 11/2013 | Curtice |
| 2014/0128296 A1 | 5/2014 | Soane |
| 2014/0262296 A1 | 9/2014 | Dobson et al. |
| 2015/0114649 A1 | 4/2015 | Osorio et al. |
| 2016/0122625 A1 | 5/2016 | Singh et al. |

FOREIGN PATENT DOCUMENTS

| | | | |
|---|---|---|---|
| EP | 0059062 A1 * | 9/1982 | ............ B32B 25/00 |
| EP | 898050 | 2/1999 | |
| EP | 2444455 | 4/2012 | |
| GB | 2444158 | 5/2008 | |
| WO | 2010141534 | 12/2010 | |
| WO | 2011012857 A2 | 2/2011 | |
| WO | 2011012857 A3 | 2/2011 | |
| WO | 2015065378 | 5/2015 | |
| WO | 2015088515 | 6/2015 | |

OTHER PUBLICATIONS

International Search Report and Written Opinion issued in International Application No. PCT/US2016/051533 dated Nov. 22, 2016; 14 pages.

International Search Report and Written Opinion issued in International Application No. PCT/US2016/051507 dated Nov. 18, 2016; 11 pages.

Senkal et al, "Glycidyl Methacrylate based Polymer Resins with Diethylene Triamine Tetra Acetic Acid Functions for Efficient Removal of Ca(II) and Mg(II)," Reactive & Functional Polymers, Published in 2001, pp. 151-157.

International Search Report and Written Opinion in International Application No. PCT/US2017/059539, dated Dec. 20, 2017, 12 pages.

International Search Report and Written Opinion in International Application No. PCT/US2017/059534 dated Feb. 1, 2018, 15 pages.

* cited by examiner

MALEIC ANHYDRIDE POLYMERS AND METHODS OF TREATING SUBTERRANEAN FORMATIONS

CROSS-REFERENCE TO RELATED APPLICATION

This application claims the benefit of U.S. Application Ser. No. 62/218,356 entitled "MALEIC ANHYDRIDE POLYMERS AND METHODS OF TREATING SUBTERRANEAN FORMATIONS" filed on Sep. 14, 2015, which is herein incorporated by reference in its entirety.

TECHNICAL FIELD

This document relates to methods and compositions used in treating subterranean formations.

SUMMARY

Provided in this disclosure is a composition including a maleic anhydride copolymer or a salt thereof and an amine crosslinker. The maleic anhydride copolymer includes repeat units of formulae I and II (referred to herein as "repeat unit I" and "repeat unit II"):

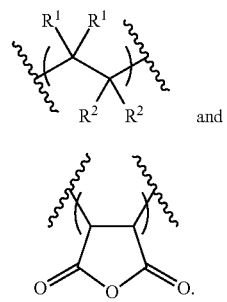

Each $R^1$ is independently selected from the group consisting of —H, —O(C$_1$-C$_5$)alkyl, and —(C$_1$-C$_5$)alkyl. Each $R^2$ is independently selected from the group consisting of —H, —O(C$_1$-C$_5$)alkyl, and —(C$_1$-C$_5$)alkyl. The maleic anhydride copolymer further includes at least one hydrolyzed repeat unit selected from hydrolyzed repeat units of formulae III and IV (referred to herein as "hydrolyzed repeat unit III" and "hydrolyzed repeat unit IV" or also referred to herein as "repeat unit III" and "repeat unit IV"):

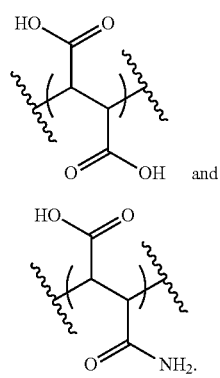

In some embodiments, the at least one hydrolyzed repeat unit includes repeat unit III. In some embodiments, the ratio of the number of repeat units III to the number of repeat units II in the maleic anhydride copolymer is about 1:10 to about 10:1. For example, the ratio of the number of repeat units III to the number of repeat units II in the maleic anhydride copolymer can be about 1:2. As used herein, a "ratio" of repeat units refers to the number of repeat units of a first repeat unit to the number of repeat units of a second repeat unit in a maleic anhydride copolymer.

In some embodiments, the at least one hydrolyzed repeat unit includes repeat unit IV. In some embodiments, the ratio of repeat unit IV to repeat unit II is about 1:10 to about 10:1. For example, the ratio of repeat unit IV to repeat unit II can be about 1:2.

In some embodiments, the hydrolyzed repeat unit includes repeat unit III and repeat unit IV. The ratio of repeat unit III to repeat unit II can be about 1:10 to about 10:1 and the ratio of repeat unit IV to repeat unit II can about 1:10 to about 10:1.

In some embodiments, each $R^1$ is independently selected from the group consisting of —H, —OCH$_3$, and —CH$_3$ and each $R^2$ is independently selected from the group consisting of —H, —OCH$_3$, and —CH$_3$. For example, $R^1$ can be H, and each $R^2$ can independently selected from the group consisting of —H, —OCH$_3$, and —CH$_3$.

In some embodiments, repeat unit I is selected from the group consisting of:

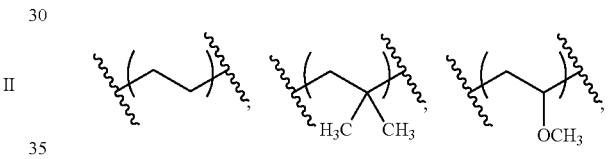

and combinations thereof.
For example, repeat unit I can have the structure:

In some embodiments, repeat unit I has the structure:

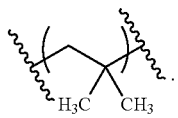

In some embodiments, the maleic anhydride copolymer has a weight-average molecular weight of about 10,000 Da to about 500,000 Da.

In some embodiments, the amine crosslinker includes a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof. For example, the amine crosslinker can include at least one of a polyethyleneimine, ethylenediamine, diethylenetriamine (DETA), triethylenetetramine (TETA), tetraethylenepentamine (TEPA), 1,2-propylenediamine, 1,3-propylenediamine, dipropylenetriamine, tripropylenetetramine, tetrapropylenepentamine, ethylene propylene triamine, ethylene dipropylene tetramine, diethylene propylene pentamine, ethylene tripropylene pentamine, diethylene dipropylene pentamine, triethylene propylene pentamine, polyethylenimine (e.g., EPOMIN® from Nippon Shokubai, LUPASOL™ from BASF, LUPAMINE™ from BASF, etc.), poly(ethyleneoxy)amine (e.g., JEFFAMINE® EDR-148 from Huntsman Corporation), poly(propyleneoxy)amine (e.g., JEFFAMINE® T-403 from Huntsman Corporation, Polyetheramine T-5000 from BASF) and combinations thereof. Additionally, the amine crosslinker can be selected from the group consisting of a polyethyleneimine, a poly(ethyleneoxy)amine, a TEPA and combinations thereof. In some embodiments, the polyethyleneimine has a weight-average molecular weight of about 500 Da to about 1,000,000 Da. The polyethyleneimine can have a weight-average molecular weight of about 1,800 Da. The polyethyleneimine can have a weight-average molecular weight of about 750,000 Da. In some embodiments, the amine crosslinker is a polyetheramine. In some embodiments, the amine crosslinker is an aliphatic amine. The aliphatic amine can be TEPA.

In some embodiments, the ratio of the maleic anhydride copolymer to the amine crosslinker is about 50:1 to about 1:1.

In some embodiments, the composition further includes a salt. The salt can be about 1% to about 10% by weight of the composition. In some embodiments, the salt is selected from the group consisting of NaCl, KCl, and combinations thereof.

In some embodiments, the composition further includes an aqueous carrier. The aqueous carrier can include water, brine, produced water, flowback water, brackish water, Arab-D-brine, sea water, or combinations thereof. In some embodiments, the aqueous carrier is about 5% to about 99% by weight of the composition.

In some embodiments, the composition has a gel time of less than about 24 hours at about 80° C. For example, the composition can have a gel time of less than about 2 hours at about 80° C.

Also, provided in this disclosure is a composition including a maleic anhydride copolymer or a salt thereof, an amine crosslinker, and an aqueous carrier. The maleic anhydride copolymer includes the repeat units:

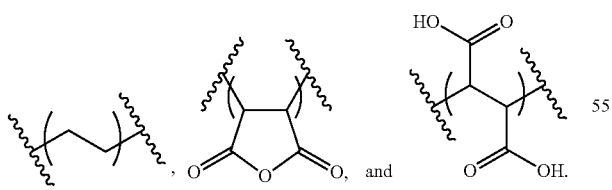

The aqueous carrier includes water, brine, produced water, flowback water, brackish water, Arab-D-brine, sea water, or combinations thereof.

Additionally, provided in this disclosure is a composition including a maleic anhydride copolymer or a salt thereof, an amine crosslinker, and an aqueous carrier. The maleic anhydride copolymer includes the repeat units:

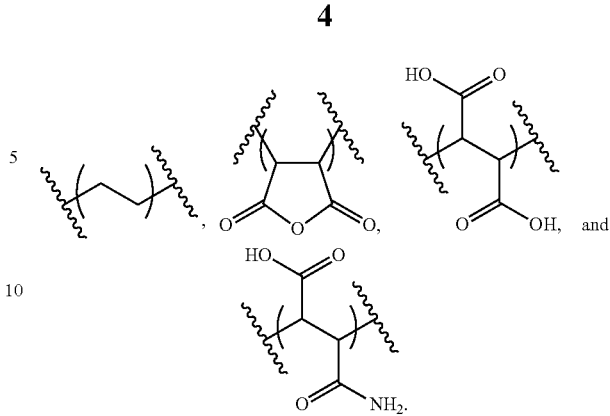

The aqueous carrier includes water, brine, produced water, flowback water, brackish water, Arab-D-brine, sea water, or combinations thereof.

Also provided in this disclosure is a method of treating a subterranean formation including providing to a subterranean formation a composition and crosslinking the composition to form a sealant. The composition includes a maleic anhydride copolymer or a salt thereof and an amine crosslinker. The maleic anhydride copolymer includes repeat units I and II:

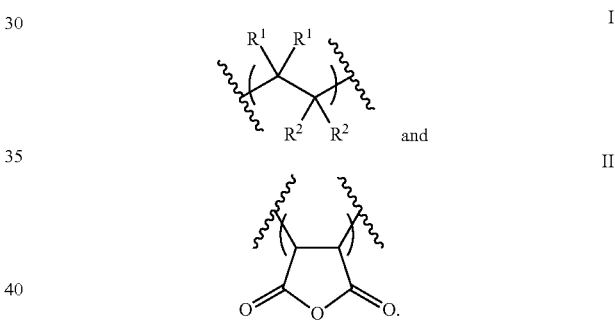

Each $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. The maleic anhydride copolymer further includes at least one hydrolyzed repeat unit selected from repeat units III and IV:

In some embodiments, the providing occurs above-surface. The providing can also occur in the subterranean formation.

In some embodiments, forming the sealant occurs near at least one of a casing, a casing-casing annulus, a casing-formation annulus, or in a tubing-casing annulus. In some embodiments, forming the sealant occurs in a void in at least one of a cement sheath and a pipe.

In some embodiments, forming the sealant prevents or retards undesired loss or flow of wellbore fluid into the formation or of formation fluids into the wellbore.

In some embodiments, the sealant prevents or retards undesired loss or leak off of fluid into the formation.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, another liquid, or a gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to about 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a C2-C40 fatty acid C1-C10 alkyl ester (e.g., a fatty acid methyl ester), 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

Compositions and Reaction Products Thereof

Provided in this disclosure is a composition including a maleic anhydride copolymer or a salt thereof and an amine crosslinker. The maleic anhydride copolymer includes repeat units I and II:

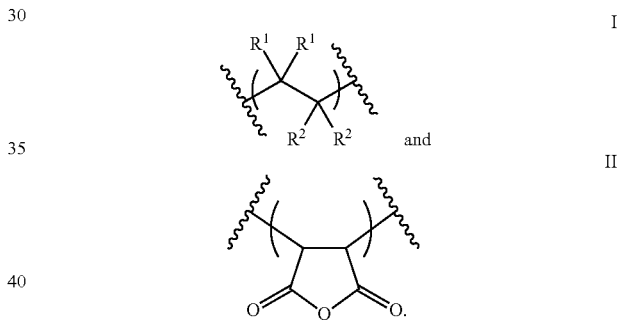

Each $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. The maleic anhydride copolymer further includes at least one hydrolyzed repeat unit selected from repeat units III and IV:

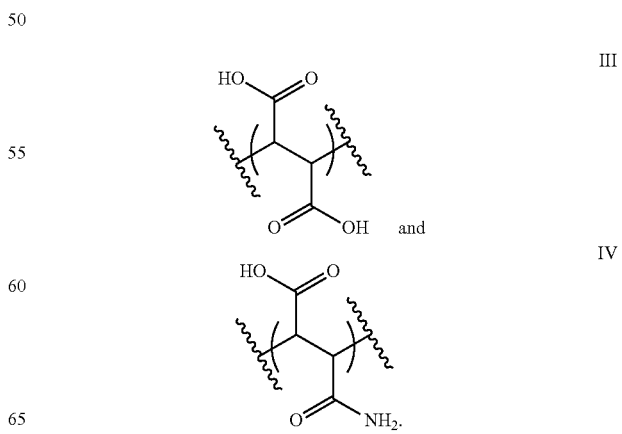

The composition can also include reaction products of the maleic anhydride copolymer and the amine crosslinker.

In some embodiments, the at least one hydrolyzed repeat unit includes repeat unit III. In some embodiments, the ratio of repeat unit III to repeat unit II is about 1:10 to about 10:1. For example, the ratio of repeat unit III to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. In some embodiments, the ratio of repeat unit III to repeat unit II is about 1:2. In some embodiments, the ratio of repeat unit III to repeat unit II is about 2:1.

In some embodiments, the at least one hydrolyzed repeat unit includes repeat unit IV. In some embodiments, the ratio of repeat unit IV to repeat unit II is about 1:10 to about 10:1. For example, the ratio of repeat unit IV to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10. In some embodiments, the ratio of repeat unit IV to repeat unit II is about 1:2.

In some embodiments, the hydrolyzed repeat unit includes repeat units III and IV. The ratio of repeat unit III to repeat unit II can be about 1:10 to about 10:1, and the ratio of the repeat unit IV to repeat unit II can about 1:10 to about 10:1. For example, the ratio of repeat unit III to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10, and the ratio of repeat unit IV to repeat unit II can be about 8:1 to about 1:8, about 6:1 to about 1:6, about 4:1 to about 1:4, about 2:1 to about 1:2, or about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or 1:10.

In some embodiments, each $R^1$ is independently selected from the group consisting of —H, —OCH$_3$, and —CH$_3$ and each $R^2$ is independently selected from the group consisting of —H, —OCH$_3$, and —CH$_3$. For example, $R^1$ can be H, and each $R^2$ can be independently selected from the group consisting of —H, —OCH$_3$, and —CH$_3$.

In some embodiments, repeat unit I is selected from the group consisting of:

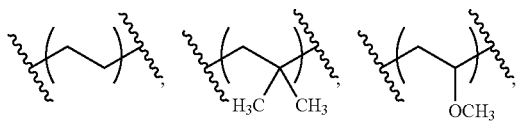

and combinations thereof.

For example, repeat unit I can have the structure:

In some embodiments, repeat unit I has the structure:

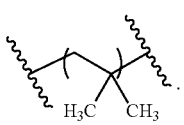

In some embodiments, the maleic anhydride copolymer has a weight-average molecular weight of about 10,000 Da to about 500,000 Da. For example, the maleic anhydride copolymer can have a weight-average molecular weight of about 10,000-100,000 Da, about 20,000-90,000 Da, about 30,000-70,000 Da, about 40,000-60,000 Da, or a weight-average molecular weight of about 45,000-55,000 Da or a weight-average molecular weight of about 10,000 Da, 20,000 Da, 30,000 Da, 40,000 Da, 50,000 Da, 60,000 Da, 70,000 Da, 80,000 Da, 90,000 Da or about 100,000 Da. The maleic anhydride copolymer can have a weight-average molecular weight of about 100,000-500,000 Da, about 200,000-400,000 Da, about 250,000-350,000 Da or a weight-average molecular weight of about 100,000 Da, 150,000 Da, 200,000 Da, 250,000 Da, 300,000 Da, 350,000 Da, 400,000 Da, 450,000 Da or about 500,000 Da. The maleic anhydride copolymer can have a weight-average molecular weight of about 50,000 Da. The maleic anhydride copolymer has a weight-average molecular weight of about 300,000 Da.

In some embodiments, the maleic anhydride copolymer has a number-average molecular weight of about 10,000 Da to about 500,000 Da. For example, the maleic anhydride copolymer can have a number-average molecular weight of about 10,000-100,000 Da, about 20,000-90,000 Da, about 30,000-70,000 Da, about 40,000-60,000 Da, or a number-average molecular weight of about 45,000-55,000 Da or a number-average molecular weight of about 10,000 Da, 20,000 Da, 30,000 Da, 40,000 Da, 50,000 Da, 60,000 Da, 70,000 Da, 80,000 Da, 90,000 Da or about 100,000 Da. The maleic anhydride copolymer can have a number-average molecular weight of about 100,000-500,000 Da, about 200,000-400,000 Da, about 250,000-350,000 Da or a number-average molecular weight of about 100,000 Da, 150,000 Da, 200,000 Da, 250,000 Da, 300,000 Da, 350,000 Da, 400,000 Da, 450,000 Da or about 500,000 Da. The maleic anhydride copolymer can have a number-average molecular weight of about 50,000 Da. The maleic anhydride copolymer has a number-average molecular weight of about 300,000 Da.

In some embodiments, the distribution of repeat units I and II can be alternating, random or in blocks, in which case the resulting copolymers are referred to as alternating, random or block copolymers, respectively. In an embodiment, the copolymer is an alternating copolymer, with alternating repeat units I and II.

Examples of suitable maleic anhydride copolymers include ISOBAM® polymers from Kuraray Company (Tokyo, Japan), ethylene-maleic anhydride copolymers and propylene-maleic anhydride copolymers from Honeywell Corporation (USA), and ZEMAC® copolymers from Vertellus (Spain).

In some embodiments, the amine crosslinker includes a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof. For example, the amine crosslinker can include at least one of a polyethyleneimine, an ethylenediamine, a DETA, a TETA, a TEPA, a 1,2-propylenediamine, a 1,3-propylenediamine, a dipropylenetriamine, a tripropylenetetramine, a tetrapropylenepentamine, an ethylene propylene triamine, an ethylene dipropylene tetramine, a diethylene propylene pentamine, an ethylene tripropylene pentamine, a diethylene dipropylene pentamine, a triethylene propylene pentamine, a polyethylenimine (e.g., EPOMIN® from Nippon Shokubai, LUPASOL™ from BASF, LUPAMINE™ from BASF, etc.), a poly(ethyleneoxy)amine (e.g., JEFFAMINE® EDR-148 from Huntsman Corporation), a poly(propyleneoxy)amine (e.g., JEFFAM- INE® T-403 from Huntsman Corporation, Polyetheramine T-5000 from BASF) and combinations thereof. Additionally, the amine crosslinker can be selected from the group consisting of a polyethyleneimine, a poly(ethyleneoxy)amine, a TEPA and combinations thereof.

In some embodiments, the polyethyleneimine has a weight-average molecular weight of about 500 Da to about 1,000,000 Da. In some embodiments, the polyethyleneimine has a weight-average molecular weight of about 1,000-1,000,000. For example, the polyethyleneimine can have a weight-average molecular weight of about 1,000-5,000, 5,000-10,000, 10,000-50,000, 50,000-150,000, 150,000-500,000 or about 500,000 to about 1,000,000 or about 1,000, 2,000, 3,000, 4,000, 5,000, 10,000, 25,000, 50,000, 100,000, 250,000, 500,000, 750,000 or about 1,000,000. In some embodiments, the polyethyleneimine has a weight-average molecular weight of about 1,800 Da. The polyethyleneimine can have a weight-average molecular weight of about 1,800 Da. The polyethyleneimine can have a weight-average molecular weight of about 750,000 Da. In some embodiments, the amine crosslinker is a polyetheramine. In some embodiments, the amine crosslinker is an aliphatic amine. The aliphatic amine can be TEPA. In some embodiments, the amine crosslinker is TEPA.

In some embodiments, the ratio of the maleic anhydride copolymer to the amine crosslinker is about 50:1 to about 1:1. For example, the weight ratio of the crosslinkable polymer to the amine crosslinker can be about 40:1 to about 1:1, about 30:1 to about 1:1, about 20:1 to about 1:1, about 15:1 to about 1:1, about 10:1 to about 1:1, about 9:1 to about 1:1, about 7:1 to about 1:1, about 5:1 to about 1:1, about 4:1 to about 1:1, about 3:1 to about 1:1, or about 2:1 to about 1:1, or about, 50:1, 40:1, 30:1, 20:1, 15:1, 10:1, 9:1, 8:1, 7:1, 6:1, 5:1, 4:1, 3:1, 2:1, 1:1. One of ordinary skill in the art will appreciate that the ratio of the maleic anhydride copolymer to the amine crosslinker can be varied based on the desired properties of the crosslinked product to be formed, such as the desired gel time.

In some embodiments, the composition further includes a salt. The salt can be about 1% to about 10% by weight of the composition. The salt can be selected from NaCl, NaBr, KCl, KBr, CaCl$_2$, MgCl$_2$, NaNO$_3$, KNO$_3$, NaC$_2$H$_3$O$_2$, KC$_2$H$_3$O$_2$, NaCHO$_2$, KCHO$_2$, or combinations thereof. For example, the salt can be selected from the group consisting of NaCl, KCl, and combinations thereof.

In some embodiments, the composition further includes an aqueous carrier. The aqueous carrier can include water, brine, produced water, flowback water, brackish water, Arab-D-brine, sea water, or combinations thereof. In some embodiments, the aqueous carrier is about 1% to about 99% by weight of the composition. In some embodiments, the aqueous carrier is about 5% to about 99% by weight of the composition. For example, the aqueous carrier can be about 10%-98%, 20%-98%, 30%-98%, 40%-98%, 50%-98%, 60%-98%, 70%-98%, 80%-98%, or about 85%-98% by weight of the composition or about 10%, 20%, 30%, 40%, 50%, 60%, 70%, 80%, 85%, 90%, 91%, 92%, 93%, 94%, 95%, 96%, 97%, or about 98% by weight of the composition. The aqueous carrier can be about 90% by weight of the composition. The aqueous carrier can be about 95% of the composition by weight of the composition.

The composition can have a basic pH. For example the composition can have a pH of about 7 to about 11, about 7.5 to about 10, or about 8 to about 9. In some embodiments, the composition has a pH of about 8 to about 9. The composition can have a pH of about 7.5, 8, 8.5, 9, 10, or about 11.

In some embodiments, the composition has a gel time of less than about 24 hours at about 80° C. For example, the composition can have a gel time of less than about 24 hours at about 80° C. when the maleic anhydride copolymer and amine crosslinker are about 1% to about 5% by weight of the composition, about 5% to about 10%, about 10% to about 20%, or about 20% to about 30% by weight of the composition. The composition can have a gel time of less than about 24 hours at about 80° C. when the maleic anhydride copolymer and amine crosslinker are about 10% by weight of composition and the carrier solvent is water. The composition can have a gel time of less than about 24 hours at about 80° C. when the maleic anhydride copolymer and amine crosslinker are about 5% by weight of composition and the carrier solvent is water. In some embodiments, the composition has a gel time of less than about 2 hours at about 80° C. when the maleic anhydride copolymer and amine crosslinker are present in a weight ratio of 10:1, and the carrier solvent is water. In some embodiments, the composition has a gel time of less than about 2 hours at about 80° C. when the maleic anhydride copolymer and amine crosslinker are about 5% by weight of composition and the carrier solvent is water.

Also, provided in this disclosure is a composition including a maleic anhydride copolymer or a salt thereof, an amine crosslinker, and an aqueous carrier. The maleic anhydride copolymer includes the repeat units:

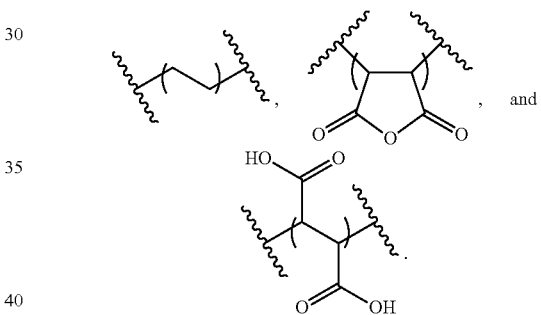

The aqueous carrier includes water, brine, produced water, flowback water, brackish water, Arab-D-brine, sea water, or combinations thereof.

In some embodiments, the amine crosslinker is selected from the group consisting of polyethyleneimine, TEPA, and combinations thereof. The polyethyleneimine can have a weight-average molecular weight of about 1,800 Da. The polyethyleneimine can have a weight-average molecular weight of about 750,000 Da. In some embodiments the amine crosslinker is TEPA.

In some embodiments, the aqueous carrier can include water, brine, produced water, flowback water, brackish water, Arab-D-brine, sea water, or combinations thereof.

Additionally, provided in this disclosure is a composition including a maleic anhydride copolymer or a salt thereof, an amine crosslinker, and an aqueous carrier. The maleic anhydride copolymer includes the repeat units:

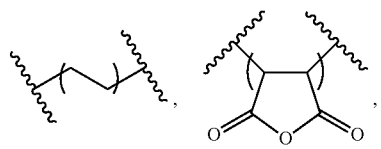

-continued

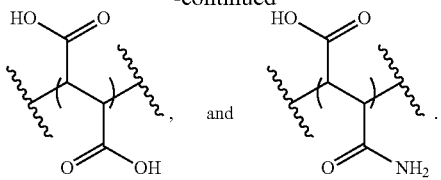

The aqueous carrier includes water, brine, produced water, flowback water, brackish water, Arab-D-brine, sea water, or combinations thereof.

Additionally, provided in this disclosure is a composition including a maleic anhydride copolymer or a salt thereof, an amine crosslinker, and an aqueous carrier. The maleic anhydride copolymer includes the repeat units:

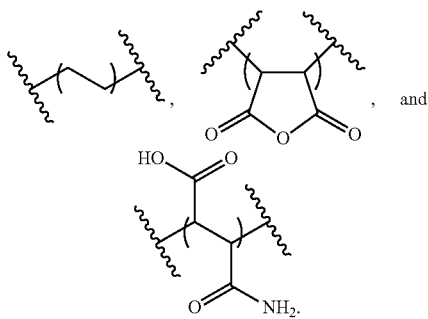

The aqueous carrier includes water, brine, produced water, flowback water, brackish water, Arab-D-brine, sea water, or combinations thereof.

In some embodiments, the amine crosslinker is selected from the group consisting of polyethyleneimine, TEPA, and combinations thereof. The polyethyleneimine can have a weight-average molecular weight of about 1,800 Da. The polyethyleneimine can have a weight-average molecular weight of about 750,000 Da. In some embodiments the amine crosslinker is TEPA.

In some embodiments, the aqueous carrier can include water, brine, produced water, flowback water, brackish water, Arab-D-brine, sea water, or combinations thereof.

Also, provided in this disclosure is a composition including a maleic anhydride copolymer and an amine crosslinker. The maleic anhydride copolymer includes repeat units I and II:

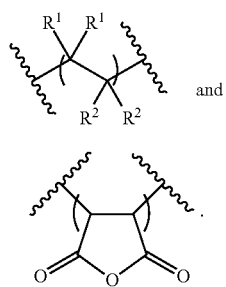

Each, $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. The maleic anhydride copolymer further includes at least one hydrolyzed repeat unit selected from repeat units III and IV:

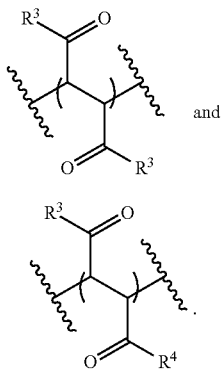

Each $R^3$ is independently selected from —OH and Each $M^1$ is independently selected from an alkali metal, an alkaline earth metal, an ammonium ion, and a quaternary ammonium ion. Each $R^4$ is independently selected from —$NH_2$ and —$OM^1$.

In some embodiments, $M^1$ is selected from $Na^+$, $K^+$, $mg^{2+}$, $NH_4^+$, $Ca^{2+}$ and $Ba^{2-}$. For example, $M^1$ can be selected from $Na^+$ and $K^+$.

Also, provided in this disclosure is a composition including a maleic anhydride copolymer or a salt thereof, an amine crosslinker, and an aqueous carrier. The maleic anhydride copolymer includes the repeat units:

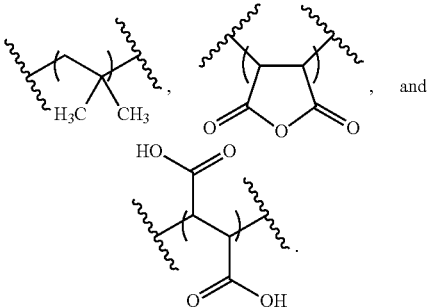

The aqueous carrier includes water, brine, produced water, flowback water, brackish water, Arab-D-brine, sea water, or combinations thereof.

In some embodiments, the amine crosslinker is selected from the group consisting of polyethyleneimine, TEPA, and combinations thereof. The polyethyleneimine can have a weight-average molecular weight of about 1,800 Da. The polyethyleneimine can have a weight-average molecular weight of about 750,000 Da.

In some embodiments the amine crosslinker is TEPA. The ratio of the maleic anhydride copolymer to TEPA can be about 10:0.1 to about 10:3, about 10:0.2 to about 10:1, or about 10:0.3 to about 10:0.7. The ratio of the maleic anhydride copolymer to TEPA can be about 10:0.1, about 10:0.3, about 10:0.4, about 10:0.5, about 10:0.6, about 10:0.7, about 10:1, about 10:1, or about 10:2. In some embodiments, ratio of the maleic anhydride copolymer to TEPA can be about 10:0.5.

In some embodiments, the aqueous carrier can include water, brine, produced water, flowback water, brackish water, Arab-D-brine, sea water, or combinations thereof.

The composition can have a basic pH. For example the composition can have a pH of about 7 to about 11, about 7.5 to about 10, or about 8 to about 9. In some embodiments, the composition has a pH of about 8 to about 9. The composition can have a pH of about 7.5, 8, 8.5, 9, 10, or about 11.

Additionally, provided in this disclosure is a composition including a maleic anhydride copolymer or a salt thereof, an amine crosslinker, and an aqueous carrier. The maleic anhydride copolymer includes the repeat units:

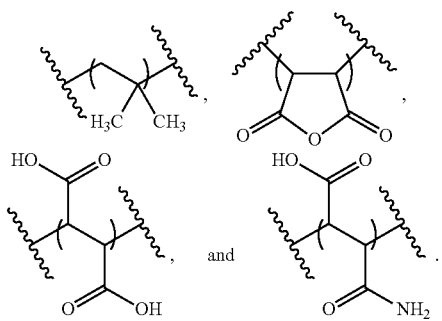

The aqueous carrier includes water, brine, produced water, flowback water, brackish water, Arab-D-brine, sea water, or combinations thereof.

Additionally, provided in this disclosure is a composition including a maleic anhydride copolymer or a salt thereof, an amine crosslinker, and an aqueous carrier. The maleic anhydride copolymer includes the repeat units:

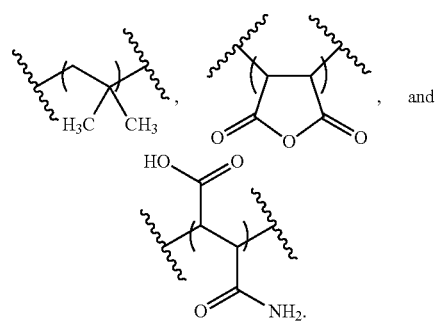

The aqueous carrier includes water, brine, produced water, flowback water, brackish water, Arab-D-brine, sea water, or combinations thereof.

In some embodiments, the amine crosslinker is selected from the group consisting of polyethyleneimine, TEPA, and combinations thereof. The polyethyleneimine can have a weight-average molecular weight of about 1,800 Da. The polyethyleneimine can have a weight-average molecular weight of about 750,000 Da.

In some embodiments, the amine crosslinker is TEPA. The ratio of the maleic anhydride copolymer to TEPA can be about 10:0.1 to about 10:3, about 10:0.2 to about 10:1, or about 10:0.3 to about 10:0.7. The ratio of the maleic anhydride copolymer to TEPA can be about 10:0.1, about 10:0.3, about 10:0.4, about 10:0.5, about 10:0.6, about 10:0.7, about 10:1, or about 10:2. In some embodiments, ratio of the maleic anhydride copolymer to TEPA can be about 10:0.5.

In some embodiments, the aqueous carrier can include water, brine, produced water, flowback water, brackish water, Arab-D-brine, sea water, or combinations thereof.

The composition can have a basic pH. For example the composition can have a pH of about 7 to about 11, about 7.5 to about 10, or about 8 to about 9. In some embodiments, the composition has a pH of about 8 to about 9. The composition can have a pH of about 7.5, 8, 8.5, 9, 10, or about 11.

Methods of Producing Maleic Anhydride Copolymers

Also provided within this disclosure are methods of making the maleic anhydride copolymers described in this disclosure.

Maleic anhydride copolymers containing the hydrolyzed repeat unit III can be produced by exposing a maleic anhydride copolymer including repeat units I and II to a sodium hydroxide solution. Each $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. Exposure to the sodium hydroxide solution can hydrolyze a portion of the maleic anhydride functional groups to provide the 1,2-dicarboxylic acid repeat unit III as its sodium salt. Other suitable basic solutions can also be used hydrolyze at least a portion of the maleic anhydride repeat units of the maleic anhydride copolymer. One of ordinary skill in the art will appreciate that the ratio of repeat units III to II can be increased by increasing the equivalents of sodium hydroxide used in the hydrolysis reaction and/or increasing the reaction time. Alternatively, acid catalyzed hydrolysis may be used to produce the 1,2-dicarboxylic acid repeat unit III from at least a portion of the maleic anhydride repeat units present in the maleic anhydride copolymer.

Maleic anhydride copolymers containing repeat unit IV can be produced by exposing a maleic anhydride copolymer including the repeat units I and II to an ammonium hydroxide solution. Each $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. Exposure to the ammonium hydroxide solution hydrolyzes a portion of the maleic anhydride functional groups to provide repeat unit IV, a carboxylic acid/amide repeat unit. Other suitable solutions can also be used to form hydrolyzed repeat units IV. One of ordinary skill in the art will appreciate that the ratio of repeat units IV to II can be increased by increasing the equivalents of ammonium hydroxide used in the hydrolysis reaction and/or increasing the reaction time.

Other Components

In various embodiments, the composition including the maleic anhydride copolymer and amine crosslinker, can further include one or more suitable additional components. The additional components can be any suitable additional components, such that the composition can be used as described herein.

The composition including the maleic anhydride copolymer and amine crosslinker can further include one or more fluids. The composition can include a fluid including at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon including an internal olefin, a hydrocarbon including an alpha olefin, xylenes, an ionic liquid, methyl ethyl ketone, and cyclohexanone. The composition can include any suitable proportion of the one or more fluids, such as about 0.001 wt. % to about 99 wt. %, about 20 wt. % to about 90 wt. %, or about 0.001 wt. % or less, or about 0.01 wt. %, 0.1, 1, 2, 3, 4, 5, 10, 15, 20, 30, 40, 50, 60, 70, 80, 85, 90, 91, 92, 93, 94, 95, 96, 97, 98, 99 wt. % or more of the composition.

The composition can further include a viscosifier, in addition to the maleic anhydride copolymer and amine crosslinker. The viscosifier can be present in any suitable concentration, such as more, less, or an equal concentration as compared to the concentration of the maleic anhydride copolymer and amine crosslinker. The viscosifier can include at least one of a substituted or unsubstituted polysaccharide. The viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide.

The composition including the maleic anhydride copolymer and amine crosslinker can be combined with any suitable downhole fluid before, during, or after the placement of the composition in a subterranean formation or the contacting of the composition and a subterranean material. For example, the composition including the maleic anhydride copolymer and amine crosslinker can be combined with a downhole fluid above the surface, and then the combined composition is placed in a subterranean formation or contacted with a subterranean material. Alternatively, the composition including the maleic anhydride copolymer and amine crosslinker can be injected into a subterranean formation to combine with a downhole fluid, and the combined composition is contacted with a subterranean material or is considered to be placed in the subterranean formation. In some embodiments, at least one of prior to, during, and after the placement of the composition in the subterranean formation or contacting of the subterranean material and the composition, the composition is used in the subterranean formation alone or in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the crosslinkable polymer and amine crosslinker, in any suitable amount, such as about 1 wt. % or less, about 2 wt. %, 3, 4, 5, 10, 15, 20, 30, 40, 50, 60, 70, 80, 85, 90, 95, 96, 97, 98, or about 99 wt. % or more of the mixture.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

Also, provided herein are crosslinked reaction products of the maleic anhydride copolymer and the amine crosslinker. The crosslinked reaction product can form a sealant (e.g., a sealant gel). In some embodiments, the sealant is a stiff gel, a ringing gel, or a lipping gel.

Method of Treating a Subterranean Formation

Also provided in this disclosure is a method of treating a subterranean formation including providing to a subterranean formation a composition and crosslinking the composition to form a sealant. The composition includes a maleic anhydride copolymer or a salt thereof and an amine crosslinker. The maleic anhydride copolymer includes repeat units I and II.

Each $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. The maleic anhydride copolymer further includes at least one hydrolyzed repeat unit selected from repeat units III and IV.

In some embodiments, the providing occurs above-surface. The providing can also occur in the subterranean formation.

In some embodiments, forming the sealant occurs near at least one of a casing, a casing-casing annulus, a tubing-casing annulus, or a casing-formation annulus. In some embodiments, forming the sealant occurs in a void (e.g., cracks, microannuli, etc.) in at least one of a cement, cement sheath, and pipe.

In some embodiments, forming the sealant prevents or retards undesired loss or flow of wellbore fluid into the formation or of formation fluids into the wellbore. In some embodiments, the sealant prevents or retards undesired loss or leak off of fluid into the formation Also, provided in this disclosure is a method of preventing or alleviating loss of drilling fluid or other fluid circulation in a wellbore penetrating a subterranean formation. In some embodiments, the composition including the maleic anhydride copolymer and amine crosslinker is provided in a weighted or unweighted "pill" for introduction into the wellbore. Such "pills" typically comprise the composition blended with a required amount of water, base oil, water base drilling fluid, or non-aqueous base drilling fluid and in some cases a weighting agent such as barite, calcium carbonate, or a salt. The amount of the composition used in the pill will depend on the size of the subterranean fracture, opening, or lost circulation zone to be treated. Multiple pills or treatments may be used if needed. In some embodiments, drilling is stopped while the pill comprising the composition is introduced into the wellbore. The composition can enter lost circulation zones or porous or fractured portions of the formation where it will prevent or retard the entry of drilling and other wellbore fluids. Further, pressure can be used to squeeze the pill into the lost circulation zone and de-fluidize a slurry.

Also, provided herein is a method of servicing a wellbore. The method includes providing a composition including a maleic anhydride copolymer or a salt thereof and an amine crosslinker within a portion of at least one of a wellbore and a subterranean formation.

The maleic anhydride copolymer includes repeat units I and II. Each $R^1$ is independently selected from the group consisting of —H, —O($C_1$-$C_5$)alkyl, and —($C_1$-$C_5$)alkyl. Each $R^2$ is independently selected from the group consisting of —H, —O($C_1$-$C_5$)alkyl, and —($C_1$-$C_5$)alkyl. The maleic anhydride copolymer further includes at least one hydrolyzed repeat unit selected from repeat units III and IV.

In some embodiments, the composition is introduced into at least one of a wellbore and a subterranean formation using a pump. The maleic anhydride copolymer and the amine crosslinker can be pumped together from at least one source or simultaneously from at least two different sources. Alternatively, the maleic anhydride copolymer can be pumped first and the amine crosslinker can be pumped second. Alternatively, the amine crosslinker can be pumped first and the maleic anhydride copolymer can be pumped second.

EXAMPLES

Two different polymers were utilized in this study. The first, obtained from a commercial source, was partially hydrolyzed poly(maleic anhydride/i sobutylene)copolymer with a monomer ratio of 1:1 and a weight-average molecular weight of $5\times10^4$ hydrolyzed with ammonium hydroxide to generate amide-ammonium type of hydrolyzed functional groups. The second was partially hydrolyzed poly(maleic anhydride/isobutylene) sodium salt formed by hydrolyzing non-water soluble poly(maleic anhydride) with a weight-average molecular weight of $3\times10^5$ with sodium hydroxide at room temperature to generate sufficient hydrolysis (60% in the present case) to make it completely water soluble.

Three amine-type crosslinkers were used to crosslink the base polymers to provide suitable gel times (crosslink times) for placement by injection. The types of crosslinkers included: (1) polyethyleneimine (PEI, a crosslinker that can be branched and contain primary, secondary, and tertiary amines) with high (PEI high molecular weight (HMW)—weight-average MW 750,000 Da) and low (PEI low molecular weight (LMW)—weight-average MW=1,800 Da) molecular weights; (2) polyetheramines, which contained only primary amines at the chain end with the chain primarily comprised of polymerized ethylene oxide and/or propylene oxide; and (3) polyamines such as TEPA, which contains only primary and secondary amines.

A wide range of polymer to amine weight ratios was used, and the results are provided in Tables 1-4 for the two base polymers at different polymer concentrations using different crosslinkers. The stability of the crosslinked gels was monitored by aging the gels at test temperature and observing the gels for expulsion of free water and separation of shrunken gel. This phenomenon, called syneresis' is taken as an indication of gel's ability to provide sealant action in a flow path.

A general procedure included dissolving the polymer in water to prepare a 5 or 10% solution as noted in Tables 1-4. To a stirred solution of the polymer, amine liquid was added in specified weight ratio with stirring. The solution mixtures were either kept in glass test tubes and kept in an oven at specified temperature, and observed for visible signs of gelation. Alternately, the gel times were measured using Brookfield Viscometer (DV2+ Model) supplied by Brookfield Engineering Laboratories, Inc. (Massachussetts, USA), and viscosity was monitored as a function of time at a specific temperature using a #3 spindle. The gel times are defined as the time at which slope of the curve (viscosity versus time) increases sharply. In all cases, the gels were stiff ringing type gels. A 'stiff gel' may be defined as a gel that when taken out of its container retains its shape and does not deform. A 'ringing gel' is defined as a gel that when a container containing the gel is gently tapped on a hard surface, it will vibrate like a tuning fork. A 'lipping or weaker' gel' is defined as a gel that when a container holding the gel is tilted, the gel will deform and tend to extend, elastically, in the direction of the tilt.

TABLE 1

Gelling of 5% Aqueous Solutions of Partially hydrolyzed isobutylene/Maleic anhydride ammonium salt (Mol. Wt - 55K-65K) at 180 F.

| Crosslinker | Polymer/Crosslinker wt ratio | Salt (NaCl) Wt % | Gel Time, hrs | Comments |
| --- | --- | --- | --- | --- |
| PEI (HMW) | 5:1 | 2 | | Syneresed in 36 hrs |
| PEI (HMW) | 26:1 | 2 | No Gel in 10 days | |
| PEI (HMW) | 7:1 | 2 | 1.5 | Syneresis in 7-10 days |
| PEI (HMW) | 4:1 | 2 | 1 | Syneresis in 5-7 days |
| PEI (LMW) | 25:1 | 4.5 | No gel in 4 days | |
| PEI (LMW) | 12.5:1 | 2 | 2 | |
| PEI (LMW) | 5:1 | 7 | 2 | |
| PEI (LMW) | 5:1 | 0 | No gel in 76 hrs | |
| PEI (LMW) | 8:1 | 0 | No gel in 76 hrs | |
| PEI (LMW) | 25:1 | 0 | No gel in 76 hrs | |
| Polyetheramine (T-403) | 5:1 to 1.25:1 | 0 | No gel in 60 hrs | |
| Polyetheramine (D4000) | 5:1 to 1.25:1 | 0 | No gel in 60 hrs | |
| Polyetheramine (T5000) | 5:1 to 1.25:1 | 0 | No gel in 60 hrs | |
| Polyetheramine (D2000) | 5:1 to 1.25:1 | 0 | No gel in 60 hrs | |

TABLE 1-continued

Gelling of 5% Aqueous Solutions of Partially hydrolyzed isobutylene/Maleic anhydride ammonium salt (Mol. Wt - 55K-65K) at 180 F.

| Crosslinker | Polymer/Crosslinker wt ratio | Salt (NaCl) Wt % | Gel Time, hrs | Comments |
|---|---|---|---|---|
| Polyvinyl alcohol/vinyl amine | | | No gel in 60 hrs | |
| Tetraethylene pentaamine | 5:1 | | <60 | |

TABLE 2

Gelling of 10% Aqueous Solutions of Partially hydrolyzed isobutylene/Maleic anhydride ammonium salt (Mol. Wt - 55K-65K)

| Crosslinker | Polymer/Crosslinker wt ratio | Salt (kCl) Wt % | Temp., °F. | Gel Time, hrs | Comments |
|---|---|---|---|---|---|
| PEI (LMW) | 50:1 | 0 | 180 | 2 | Weaker gel |
| PEI (LMW) | 17:1 | 0 | 180 | 1:10 | Ringing gel |
| PEI (LMW) | 10:1 | 0 | 180 | 1:40 | Ringing Gel |
| PEI (LMW) | 17:1 | 2 | 180 | 1:40 | |
| PEI (LMW) | 17:1 | 4 | 180 | 1:30 | |
| PEI (LMW) | 17:1 | 8 | 180 | 1:50 | |
| PEI (LMW) | 17:1 | 0 | 180 | 1:20 | |
| PEI (LMW) | 17:1 | 0 | 160 | 1:20 | |
| PEI (LMW) | 17:1 | 0 | 140 | 2:50 | |

TABLE 3

Gelling of 10% Aqueous Solutions of Partially hydrolyzed isobutylene/Maleic anhydride ammonium salt (Mol. Wt - 55K-65K)

| Crosslinker | Polymer/Crosslinker wt ratio | Salt (kCl) Wt % | Temp., °F. | Gel Time, hrs | Comments |
|---|---|---|---|---|---|
| TEPA | 10:1 | 0 | 180 | 24 hrs < GT > 3 hrs | |
| TEPA | 10:3 | 0 | 180 | 24 hrs < GT > 3 hrs | |
| TEPA | 2:1 | 0 | 180 | 24 hrs < GT > 3 hrs | |
| TEGDA (ED 148) | 10.3 | 0 | 180 | <24 hrs | |
| TEGDA (ED 148) | 2:1 | 0 | 180 | 28 hrs | Weak gel |
| TEGDA (ED 148) | 10:7 | 0 | 180 | 70 hrs < GT > 48 hrs | Weaker gel |

GT = Gel Time

TABLE 4

Gelling of 5% Aqueous Solutions of Partially Hydrolyzed (60% Hydrolysis) Sodium salt of isobutylene/Maleic anhydride copolymer (Mol. Wt 160K-170K)

| Crosslinker | Polymer/Crosslinker wt ratio | Salt (kCl) Wt % | Temp., °F. | Gel Time, hrs | Comments |
|---|---|---|---|---|---|
| PEI (LMW) | 12.5:1 | 2 | 180 | 70 | Stability >10 days |
| PEI (LMW) | 8.3:1 | 2 | 180 | 10 days | |
| PEI (LMW) | 4.2:1 | 2 | 180 | 10 days | |
| PEI (HMW) | 12.5 | 2 | 180 | No gel in 76 hrs | |
| PEI (HMW) | 7.6:1 | 2 | 180 | 1.5 | Syneresis |
| PEI (HMW) | 4.2:1 | 2 | 180 | 1 | Syneresis |

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A composition comprising:
   a water-soluble maleic anhydride copolymer comprising:
   repeat units I and II:

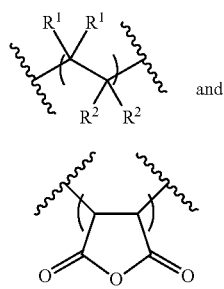

wherein the maleic anhydride copolymer is an alternating copolymer, with alternating repeat units I and II, each $R^1$ is independently selected from the group consisting of —H, —O($C_1$-$C_5$)alkyl, and ($C_1$-$C_5$)alkyl, and each $R^2$ is independently selected from the group consisting of —H, —O($C_1$-$C_5$)alkyl, and —($C_1$-$C_5$)alkyl; and
   at least one hydrolyzed repeat unit selected from repeat units III and IV:

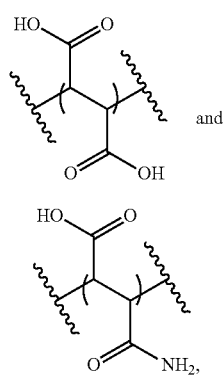

or a salt thereof;
   an amine crosslinker;
   an aqueous carrier, and
   a salt from about 1% to about 10% by weight of the composition,
   wherein when the composition is crosslinked, the composition forms a sealant in the form of a gel, and
   wherein an amount of the maleic anhydride copolymer and amine crosslinker is about 5% to about 10% by weight of the composition.

2. The composition of claim 1, wherein the at least one hydrolyzed repeat unit comprises repeat unit III.

3. The composition of claim 2, wherein the ratio of repeat unit III to repeat unit II is about 1:10 to about 10:1.

4. The composition of claim 1, wherein the at least one hydrolyzed repeat unit comprises repeat unit IV.

5. The composition of claim 4, wherein the ratio of repeat unit IV to repeat unit II is about 1:10 to about 10:1.

6. The composition of claim 1, wherein the at least one hydrolyzed repeat unit comprises at least two hydrolyzed repeat units, and the at least two hydrolyzed repeat units comprise repeat unit III and repeat unit IV.

7. The composition of claim 6, wherein the ratio of repeat unit III to repeat unit II is about 1:10 to about 10:1, and the ratio of repeat unit IV to repeat unit II is about 1:10 to about 10:1.

8. The composition of claim 1, wherein
   each $R^1$ is independently selected from the group consisting of —H, —$OCH_3$, and —$CH_3$, and
   each $R^2$ is independently selected from the group consisting of —H, —$OCH_3$, and —$CH_3$.

9. The composition of claim 8, wherein
   each $R^1$ is H, and
   each $R^2$ is independently selected from the group consisting of —H, —$OCH_3$, and —$CH_3$.

10. The composition of claim 9, wherein repeat unit I is selected from the group consisting of:

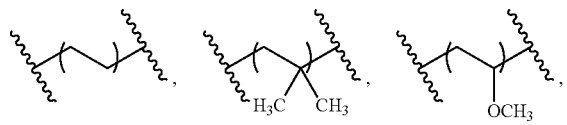

and combinations thereof.

11. The composition of claim 1, wherein the amine crosslinker is selected from the group consisting of a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof.

12. The composition of claim 1, wherein the salt is selected from NaCl, NaBr, KCl, KBr, $CaCl_2$, $MgCl_2$, $NaNO_3$, $KNO_3$, $NaC_2H_3O_2$, $KC_2H_3O_2$, $NaCHO_2$, $KCHO_2$, and combinations thereof.

13. The composition of claim 1, wherein the salt is NaCl or KCl.

14. The composition of claim 1, wherein the amount of the salt is 2%, 4%, 4.5%, 7%, or 8% based on the weight of the composition.

15. The composition of claim 1, wherein:
   the at least one hydrolyzed repeat unit comprises repeat unit III;
   the ratio of repeat unit III to repeat unit II is about 1:10 to about 10:1;
   each R' is independently selected from the group consisting of —H, —$OCH_3$, and —$CH_3$, and
   each $R^2$ is independently selected from the group consisting of —H, —$OCH_3$, and —$CH_3$;
   the amine crosslinker is selected from the group consisting of a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof; and
   the salt is selected from NaCl, NaBr, KCl, KBr, $CaCl_2$, $MgCl_2$, $NaNO_3$, $KNO_3$, $NaC_2H_3O_2$, $KC_2H_3O_2$, $NaCHO_2$, $KCHO_2$, and combinations thereof.

16. The composition of claim 1, wherein:

the at least one hydrolyzed repeat unit comprises repeat unit IV;

the ratio of repeat unit IV to repeat unit II is about 1:10 to about 10:1;

each $R^1$ is independently selected from the group consisting of —H, —OCH$_3$, and —CH$_3$, and each $R^2$ is independently selected from the group consisting of —H, —OCH$_3$, and —CH$_3$;

the amine crosslinker is selected from the group consisting of a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof; and the salt is selected from NaCl, NaBr, KCl, KBr, CaCl$_2$, MgCl$_2$, NaNO$_3$, KNO$_3$, NaC$_2$H$_3$O$_2$, KC$_2$H$_3$O$_2$, NaCHO$_2$, KCHO$_2$, and combinations thereof.

17. The composition of claim 1, wherein:

the at least one hydrolyzed repeat unit comprises at least two hydrolyzed repeat units, and the at least two hydrolyzed repeat units comprise repeat unit III and repeat unit IV;

the ratio of repeat unit III to repeat unit II is about 1:10 to about 10:1, and the ratio of repeat unit IV to repeat unit II is about 1:10 to about 10:1;

each $R^1$ is independently selected from the group consisting of —H, —OCH$_3$, and —CH$_3$, and each $R^2$ is independently selected from the group consisting of —H, —OCH$_3$, and —CH$_3$;

the amine crosslinker is selected from the group consisting of a polyalkyleneimine, a polyetheramine, a polyalkylenepolyamine, an aliphatic amine, a polyfunctional aliphatic amine, an arylalkylamine, a heteroarylalkylamine, a chitosan, and combinations thereof; and the salt is selected from NaCl, NaBr, KCl, KBr, CaCl$_2$, MgCl$_2$, NaNO$_3$, KNO$_3$, NaC$_2$H$_3$O$_2$, KC$_2$H$_3$O$_2$, NaCHO$_2$, KCHO$_2$, and combinations thereof.

* * * * *

UNITED STATES PATENT AND TRADEMARK OFFICE
CERTIFICATE OF CORRECTION

PATENT NO. : 10,160,902 B2
APPLICATION NO. : 15/263895
DATED : December 25, 2018
INVENTOR(S) : B. Raghava Reddy It is certified that error appears in the above-identified patent and that said Letters Patent is hereby corrected as shown below:

In the Claims

Column 28, Line 55, Claim 15, delete "R'" and insert -- $R^1$ --.

Signed and Sealed this
Twenty-second Day of December, 2020

Andrei Iancu
*Director of the United States Patent and Trademark Office*